No. 679,338. Patented July 30, 1901.
F. ROHRBECK.
BUSH FOR TWO-PART BELT PULLEYS.
(Application filed Jan. 18, 1901.)

(No Model.)

Inventor.
Fritz Rohrbeck.

UNITED STATES PATENT OFFICE.

FRITZ ROHRBECK, OF ST. VEIT-ON-THE-TRIESTING, AUSTRIA-HUNGARY.

BUSH FOR TWO-PART BELT-PULLEYS.

SPECIFICATION forming part of Letters Patent No. 679,338, dated July 30, 1901.

Application filed January 18, 1901. Serial No. 43,793. (No model.)

*To all whom it may concern:*

Be it known that I, FRITZ ROHRBECK, a subject of the Emperor of Austria-Hungary, residing at St. Veit-on-the-Triesting, in the Province of Lower Austria, in the Empire of Austria-Hungary, have invented certain new and useful Improvements in Bushes for Two-Part Belt Pulleys or Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a construction of light and cheaply-producible bush for lining the bosses of two-part belt pulleys or other wheels adapted to be fixed on shafting. Such a bush consists of two curved corrugated shells, each of which partially embraces the shaft, these shells being formed by pressure or otherwise from sheet or bar iron and serving to fill the space between the shafting and the inner surface of the wheel-boss.

Figure 1:
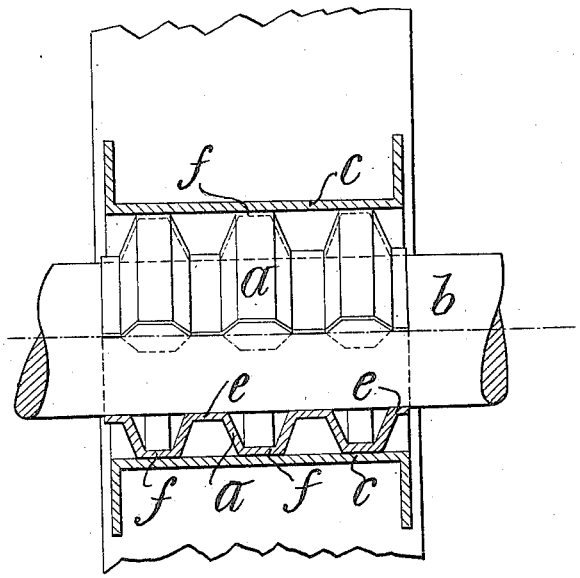
Figure 2:
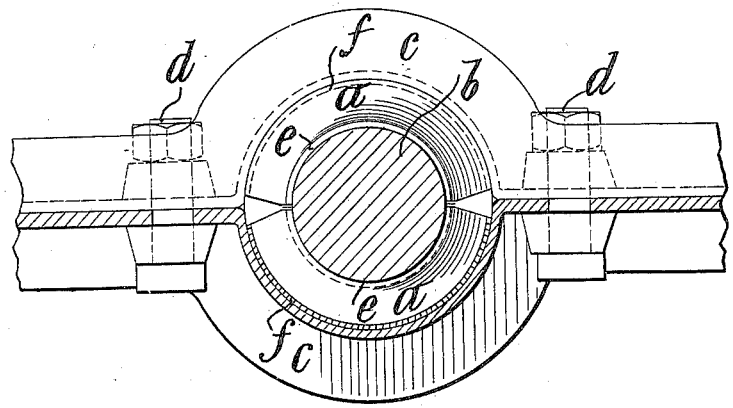

Figure 1 of the accompanying drawings illustrates the boss portion of a two-part sheet-metal pulley, together with the shafting and the improved bush, in longitudinal section. Fig. 2 is a side view, partly in section.

The bushing consists of two similar shells $a$, each surrounding nearly half the shaft $b$. The shells are corrugated to form channels having a flat bottom and diverging sides and can be manufactured by pressure or in any other way from sheet or bar iron.

In practice the shells are inserted between the shaft $b$ and the halves of the boss $c$ of the two-part belt pulley or wheel, the two parts of which are brought together by the screws $d$. The inner surfaces $e$ of the shells $a$ are thus brought into close contact with the shaft $b$, while their outer surfaces $f$ are forced tightly against the inner surface of the boss $c$.

Bushings of this kind are considerably more solid and durable than wood in bushings and possess the advantage over the present heavy metal bushes of being much lighter and cheaper in construction, especially as the contacting surfaces need no dressing.

I claim—

1. A bushing for pulleys and the like, comprising a sheet-metal shell channeled circumferentially to form alternating internal and external bearings contacting with the shaft and hub or eye of the pulley respectively, for the purpose set forth.

2. A bushing for pulleys and the like, comprising a sheet-metal shell channeled circumferentially, said channels having flat bases and diverging lateral walls and forming alternating internal and external bearings contacting with the shaft and hub or eye of the pulley respectively, for the purpose set forth.

3. A bushing for pulleys and the like, consisting of sheet-metal shell elements segmental in cross-section and channeled to form when assembled a shell having alternating internal and external circular bearings respectively contacting with the shaft and hub or eye of the pulley, for the purpose set forth.

4. A bushing for pulleys and the like, consisting of sheet-metal shell elements segmental in cross-section and channeled to form when assembled a shell having alternating internal and external circular flat bearings with diverging side walls, respectively contacting with the shaft and hub or eye of the wheel, for the purpose set forth.

In testimony that I claim the foregoing as my invention I have signed my name in presence of two subscribing witnesses.

FRITZ ROHRBECK.

Witnesses:
 JOSEF RUBERCH,
 ALVESTO S. HOGUE.